(12) United States Patent
Larson et al.

(10) Patent No.: US 10,408,451 B2
(45) Date of Patent: Sep. 10, 2019

(54) WEDGE-SHAPED CERAMIC HEAT SHIELD OF A GAS TURBINE COMBUSTION CHAMBER

(71) Applicant: Siemens Aktiengesellschaft, Munich (DE)

(72) Inventors: Marco Larson, Mulheim (DE); Marc Tertilt, Hattingen (DE)

(73) Assignee: Siemens Aktiengesellschaft, Munich (DE)

( * ) Notice: Subject to any disclaimer, the term of this patent is extended or adjusted under 35 U.S.C. 154(b) by 691 days.

(21) Appl. No.: 14/915,230

(22) PCT Filed: Sep. 10, 2014

(86) PCT No.: PCT/EP2014/069289
§ 371 (c)(1),
(2) Date: Feb. 27, 2016

(87) PCT Pub. No.: WO2015/036430
PCT Pub. Date: Mar. 19, 2015

(65) Prior Publication Data
US 2016/0201912 A1    Jul. 14, 2016

(30) Foreign Application Priority Data

Sep. 11, 2013  (DE) .................. 10 2013 218 151

(51) Int. Cl.
*F23R 3/00*      (2006.01)
*F23R 3/60*      (2006.01)
(Continued)

(52) U.S. Cl.
CPC ............... *F23R 3/002* (2013.01); *F02C 7/20* (2013.01); *F02C 7/24* (2013.01); *F23R 3/007* (2013.01);
(Continued)

(58) Field of Classification Search
CPC .. F23R 3/002; F23R 3/007; F23R 3/60; F23R 2900/03043; F02C 7/20; F05D 2240/15; F05D 2300/6033
See application file for complete search history.

(56) References Cited

U.S. PATENT DOCUMENTS 4,614,082 A * 9/1986 Sterman ................. F23R 3/002
                                                    60/752
5,323,604 A * 6/1994 Ekstedt .................... F23R 3/34
                                                    60/747
(Continued)

FOREIGN PATENT DOCUMENTS

CN          1519507 A      8/2004
CN          1748110 A      3/2006
(Continued)

OTHER PUBLICATIONS

CN Office Action dated Dec. 12, 2016, for CN patent application No. 201480050324.4.

*Primary Examiner* — Gerald L Sung
*Assistant Examiner* — James P McGlynn
(74) *Attorney, Agent, or Firm* — Beusse Wolter Sanks & Maire (57) ABSTRACT

A heat shield element for a heat shield has a support structure. The heat shield element includes a hot side which can be exposed to hot gas, a cold side opposite the hot side, and peripheral sides connecting the hot side to the cold side. The heat shield element can be fastened to the support structure of the heat shield with the cold side facing the support structure and has a height running vertically to the cold side. The height of the heat shield element increases in a rising direction, the rising portion of the heat shield element running in the rising direction substantially up to at (Continued)

least one peripheral side or up to a projection that extends the hot side over the base surface of the cold side.

13 Claims, 4 Drawing Sheets

(51) Int. Cl.
 *F02C 7/20* (2006.01)
 *F02C 7/24* (2006.01)
(52) U.S. Cl.
 CPC ............ *F23R 3/60* (2013.01); *F05D 2240/15* (2013.01); *F05D 2300/6033* (2013.01)

(56) References Cited

U.S. PATENT DOCUMENTS

| | | | |
|---|---|---|---|
| 9,097,118 B2 | 8/2015 | Schnieder et al. | |
| 2004/0182085 A1 | 9/2004 | Jeppel et al. | |
| 2006/0176671 A1 | 8/2006 | Heilos | |
| 2007/0151249 A1 | 7/2007 | Barbeln et al. | |
| 2008/0134683 A1* | 6/2008 | Foale | F23R 3/002 60/755 |
| 2010/0028128 A1* | 2/2010 | Fischer | F01D 5/18 415/1 |
| 2010/0077764 A1* | 4/2010 | Dierberger | F23R 3/002 60/754 |
| 2010/0186365 A1 | 7/2010 | Grote et al. | |
| 2012/0060503 A1* | 3/2012 | Schnieder | F01D 9/023 60/752 |
| 2015/0027128 A1 | 1/2015 | Benkler et al. | |
| 2018/0038593 A1* | 2/2018 | Quach | F02C 3/04 |

FOREIGN PATENT DOCUMENTS

| | | |
|---|---|---|
| CN | 1818527 A | 8/2006 |
| CN | 1871488 A | 11/2006 |
| DE | 102012204103 A1 | 9/2013 |
| EP | 0943867 A1 | 9/1999 |
| EP | 1741981 A1 | 1/2007 |
| EP | 2428647 A1 | 3/2012 |
| EP | 2429647 A1 | 3/2012 |
| GB | 2441342 A | 3/2008 |
| WO | 2012152530 A1 | 11/2012 |

* cited by examiner

WEDGE-SHAPED CERAMIC HEAT SHIELD OF A GAS TURBINE COMBUSTION CHAMBER

CROSS REFERENCE TO RELATED APPLICATIONS

This application is the US National Stage of International Application No. PCT/EP2014/069289 filed Sep. 10, 2014, and claims the benefit thereof. The International Application claims the benefit of German Application No. DE 102013218151.5 filed Sep. 11, 2013. All of the applications are incorporated by reference herein in their entirety.

FIELD OF INVENTION

The invention relates to a heat shield, in particular for lining a combustion chamber of a gas turbine.

BACKGROUND OF INVENTION

The walls of high-temperature gas reactors, such as gas turbine combustion chambers operating under pressure, must be protected from hot gas attack by means of suitable shielding for their supporting structure.

The heat shields comprise a supporting structure and heat shield elements which are arranged areally and are attached to the supporting structure, and which protect the supporting structure and the combustion chamber wall from hot gases. Ceramic materials are suitable for the material of the heat shield elements. In contrast to metallic materials, ceramic materials have high temperature resistance, corrosion resistance and low thermal conductivity. Also known, however, are metallic heat shield elements which are equipped with a thermal protection layer. Due to material-specific thermal expansion properties, and the temperature differences which typically arise in the context of operation (ambient temperature when stationary, maximum temperature at full load), temperature-dependent expansion of the heat shield elements must be guaranteed, in order to prevent thermal stresses—which could destroy the components—arising as a consequence of obstructed expansion. This can be achieved by lining the wall which is to be protected from hot gas attack with a multiplicity of small, individual heat shield elements. An expansion gap must be provided between the supporting structure and the individual heat shield elements; for safety reasons, this gap must never be entirely closed, even during operation. In that context, it must be ensured that the hot gas does not excessively heat the supporting wall structure via the expansion gap.

Due to the geometric shape of the known heat shield elements in the gas turbine combustion chambers, the uncovered surfaces of the supporting structure (the expansion gap) and projecting edges of the supporting structure are not optimally protected from the thermal load of the combustion chamber. As a result, at these points the supporting structure is subjected to thermal overload which must be repaired at great expense. What makes this more difficult is that the gaps which are required for thermal expansion cannot be optimally set because of the combustion chamber components which are subject to tolerances. The coarse tolerance zone of the components results in excessively large expansion gaps in the gas turbine combustion chamber. This makes it possible for the hot gas to penetrate into the expansion gaps and damage the metallic components. The damaged components must either be replaced, or it is possible to grind out the damaged areas of the supporting structure and subsequently carry out deposition welding and re-machining of the affected areas. It is also possible to coat the thermally loaded areas with a ceramic protective coating, or to deposit a high-temperature alloy onto components subject to high thermal load.

SUMMARY OF INVENTION

The invention is based on an object of specifying a heat shield element, a heat shield having at least one such heat shield element, a combustion chamber, a gas turbine having at least one such combustion chamber and a method for lining a combustion chamber with a heat shield, with which it is possible to particularly effectively avoid damage to components of a combustion chamber due to hot gas ingress.

A generic heat shield element for a heat shield comprising a supporting structure has a hot side that can be exposed to hot gas, a cold side opposite the hot side and peripheral sides. The peripheral sides connect the hot side to the cold side. The heat shield element can be attached to the supporting structure of the heat shield with the cold side facing the supporting structure and has a height normal to the cold side.

In the case of a heat shield element of the type mentioned in the introduction, the object is achieved according to the invention in that the height of the heat shield element increases in a direction of increasing height, wherein the region of increasing height of the heat shield element extends in the direction of increasing height essentially as far as at least one peripheral side or as far as a projection that extends the hot side beyond the base area of the cold side.

The heat shield element according to the invention advantageously changes the flow of a hot gas flowing in the direction over the hot side of the heat shield element so as to counter hot gas ingress into the expansion gap which adjoins the heat shield element in the direction of increasing height. In addition, the region of increasing height of the heat shield element can, depending on the installed position of the heat shield element, shield the adjoining structures from radiated heat. In other words, the increase in height of the region of increasing height extends in the direction of increasing height essentially as far as at least one peripheral side or as far as a projection that extends the hot side beyond the base area of the cold side. The region of increasing height thus acts as a spoiler.

The height of the heat shield element can for example increase only from the middle of the heat shield element. For example, the height can increase continuously or not. The increase in height can for example run linearly as far as the peripheral side or for example transition continuously from an essentially linear increase in height to an essentially horizontal profile of a projection extending the hot side beyond the base area of the cold side. The increase in height can however also continue in the region of the projection, such that the increase in height extends as far as the peripheral side which, with the end face of the projection, adjoins the hot side. Provided that the direction of increasing height is oriented perpendicular to a peripheral surface, the height of the peripheral side in the direction of increasing height is greater than the height of the peripheral side in the opposite direction.

It can be advantageously provided that the region of increasing height extends at least over the entire base area of the cold side.

In other words, the entire heat shield element is essentially in the shape of a spoiler.

Advantageously, in the region of increasing height, the height of the heat shield element can increase continuously, in particular linearly, in the direction of increasing height.

It can also be advantageously provided that the direction of increasing height is oriented essentially perpendicular to a peripheral side of the heat shield element.

It can furthermore be advantageously provided that the heat shield element comprises, on that peripheral side toward which the direction of increasing height is oriented, a projection extending essentially over the width of the peripheral side, with an upper side which is part of the hot side and, opposite this, an underside.

The projection also makes it possible to prevent the hot gas from penetrating into an expansion gap or damaging adjoining structures. Protruding edges of the combustion chamber supporting structure can be protected by means of the projection. The projection can be of constant height or, as a continuation of the ramp, can have an increasing height of the upper side up to the peripheral side.

The heat shield element is advantageously made of a ceramic material.

A further object of the invention is to specify a heat shield of the type mentioned in the introduction, with which it is possible to particularly effectively prevent damage to components of a combustion chamber due to hot gas ingress.

The object is achieved according to the invention with a heat shield of the type mentioned in the introduction, in that the heat shield comprises at least one heat shield element as claimed.

It can advantageously be provided that the heat shield comprises at least one row of heat shield elements which are formed as claimed, wherein the respective direction of increasing height of the heat shield elements is oriented toward a common end face of the row.

The heat shield advantageously has, in its edge regions, rows of heat shield elements which can have the spoiler shape according to the invention.

A further advantageous embodiment of the invention can provide that the end face is higher than a region of the supporting structure adjoining the end face and/or than heat shield elements adjoining the end face on the side thereof oriented toward the end face.

This particularly advantageously changes the flow characteristics of a hot gas flowing in the direction over the heat shield elements of the row, such that hot gas ingress into the adjoining expansion gaps of the end face can be particularly effectively avoided.

In order to even better protect the adjoining structures, it can advantageously be provided that at least one heat shield element of the row is formed as claimed, wherein the projection of the heat shield element projects beyond a respective adjoining region of the supporting structure and/or beyond a region of an adjoining heat shield element.

Advantageously, the row is a ceramic final row of the heat shield.

The ceramic final row bounds the surface covered by the ceramic heat shield elements on one side of the covered surface. Adjoining the final row can for example be a row of metallic heat shield elements or a metallic component of the supporting structure of the heat shield or a metallic component of the combustion chamber wall. These regions can be particularly effectively protected from hot gas ingress by means of the inventive configuration of the final row.

A further object of the invention is to specify a combustion chamber of the type mentioned in the introduction, with which it is possible to particularly effectively prevent damage to components of the combustion chamber due to hot gas ingress.

To that end, the combustion chamber comprises a heat shield as claimed.

Advantageously, the invention proceeds from a combustion chamber whose combustion chamber wall comprises, at its upstream end, an encircling component in which is created at least one annular groove, wherein a flame bottom, which inwardly bounds the combustion chamber head end, is attached in the groove, and the heat shield adjoins the web, that bounds the groove to one side, with an encircling final row while leaving an expansion gap.

It can advantageously be provided that the heat shield elements of the final row are formed as claimed, wherein the direction of increasing height of the heat shield elements of the final row is oriented toward the web and that end face of the final row that is oriented toward the web is higher than the adjoining region of the web.

In the case of silo combustion chambers, the web is also termed F-ring. The spoiler shape of the heat shield elements has a positive effect on the hot gas recirculation zone. This makes it more difficult for the hot gas to penetrate into the expansion gap between the final row and the F-ring, and prevents possible damage to the supporting structure. In addition, the spoiler shape protects the F-ring from radiated heat.

Advantageously, it can also be provided that the heat shield elements of the final row are formed as claimed, wherein the projection projects over that region of the web that runs between the flame bottom and the final row.

A further object of the invention is to specify a method for lining a combustion chamber with a heat shield, wherein heat shield elements are attached in rows, while leaving expansion gaps between the heat shield elements, on a supporting structure, arranged on the combustion chamber wall of the combustion chamber, of the heat shield.

The method makes it possible to particularly effectively avoid damage to components of the combustion chamber due to hot gas ingress.

To that end, with the exception of a row that is to be arranged last, the expansion gaps between the rows are matched to an ideal expansion gap width. Then, a remaining width of the space left for the row that is to be arranged last is determined; from this width, taking into account the ideal expansion gap width, an ideal width of the heat shield elements of the row that is to be arranged last is determined. The heat shield elements of the row that is to be arranged last are produced in accordance with the ideal width of the heat shield elements and are arranged in the space.

The method makes it possible, in spite of the substantial tolerance values in the dimensions of the components, to minimize the expansion gaps to an ideal width.

In order to match the heat shield elements of the row that is to be arranged last to an ideal width, it is for example possible to shorten an over-long heat shield element to a corresponding length. The method according to the invention makes it possible to compensate for the length tolerances of the individual combustion chamber components. Thus, the required expansion gaps between the rows in the combustion chamber can be reduced to a minimum, such that the size of the exposed supporting structure is effectively reduced and is thus shielded from the hot gas.

It can furthermore be advantageously provided that the width of the space left for the row that is to be arranged last is determined by provisionally lining the space with heat shield elements of measured width, and the width of at least one expansion gap adjoining the provisionally arranged row is determined during operation of the combustion chamber.

This makes it possible to add, for the ideal width of the expansion gaps, a reduced value to the measurement required during operation of the machine.

In order, in the case of a gas turbine having at least one combustion chamber, to particularly effectively avoid damage to components due to hot gas ingress, it is possible, in order to minimize the expansion gaps, to arrange the heat shield elements on the supporting structure by means of the method as claimed, and, in a particularly advantageous embodiment of the invention, it is possible, additionally or alternatively, for the heat shield to be formed as claimed in order to effectively reduce hot gas ingress into the expansion gaps.

Further expedient configurations and advantages of the invention form the subject matter of the description of exemplary embodiments of the invention, with reference to the figures of the drawing, wherein identical reference signs relate to functionally identical components.

DETAILED DESCRIPTION OF INVENTION

Figure 1:
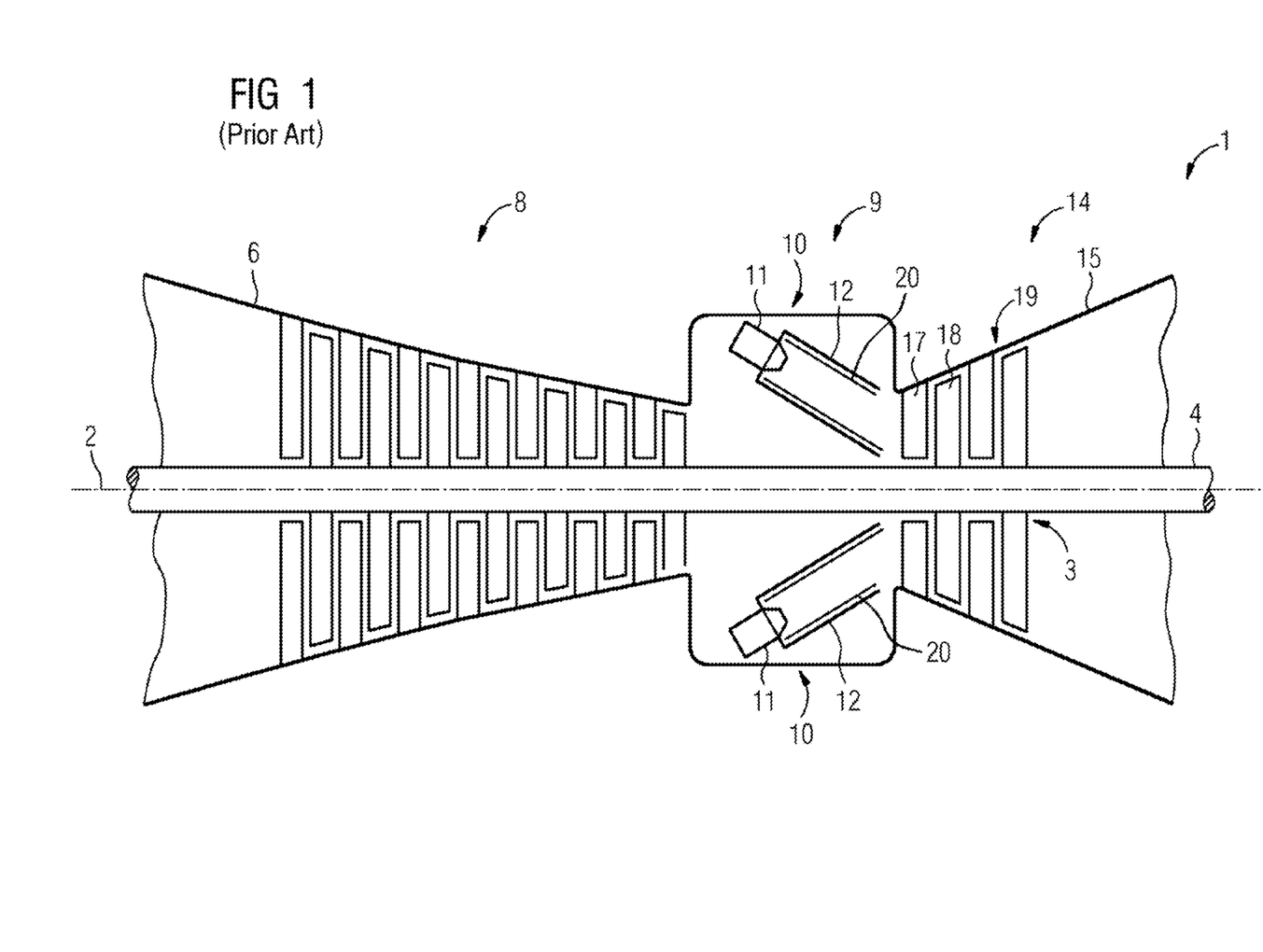
FIG. 1 shows, schematically, a longitudinal section through a gas turbine according to the prior art.

FIG. 1 shows a schematic sectional view of a gas turbine 1 according to the prior art. In the interior, the gas turbine 1 has a rotor 3 with a shaft 4 which is mounted such that it can rotate about an axis of rotation 2 and is also referred to as the turbine rotor. An intake housing 6, a compressor 8, a combustion system 9 having at least one combustion chamber 10, a turbine 14 and an exhaust gas casing 15 follow one another along the rotor 3. The combustion chambers 10 each comprise a burner arrangement 11 and a casing 12 which, for protection from hot gases, is lined with a heat shield 20. The combustion chamber 10 can for example be an annular combustion chamber or a tubular combustion chamber or a silo combustion chamber.

The combustion system 9 communicates with a, for example, annular hot gas duct. There, multiple series-connected turbine stages form the turbine 14. Each turbine stage is formed from blade or vane rings. As seen in the direction of flow of a working medium, in the hot duct a row of guide vanes 17 is followed by a row of rotor blades 18. In that context, the guide vanes 17 are secured to an inner casing of a stator 19, whereas the rotor blades 18 of a row are fitted to the rotor 3 for example by means of a turbine disk. A generator (not shown) is for example coupled to the rotor 3.

While the gas turbine is in operation, the compressor 8 sucks in air through the intake housing 6 and compresses it. The compressed air provided at the turbine-side end of the compressor 8 is passed to the combustion system 9, where it is mixed with a fuel in the region of the burner arrangement 11. The mixture is then combusted in the combustion system 9 with the aid of the burner arrangement 11, forming a working gas stream. From there, the working gas stream flows along the hot gas duct past the guide vanes 17 and the rotor blades 18. The working gas stream expands at the rotor blades 18, imparting its momentum, so that the rotor blades 18 drive the rotor 3 and the latter drives the generator (not shown) coupled to it.

Figure 2:
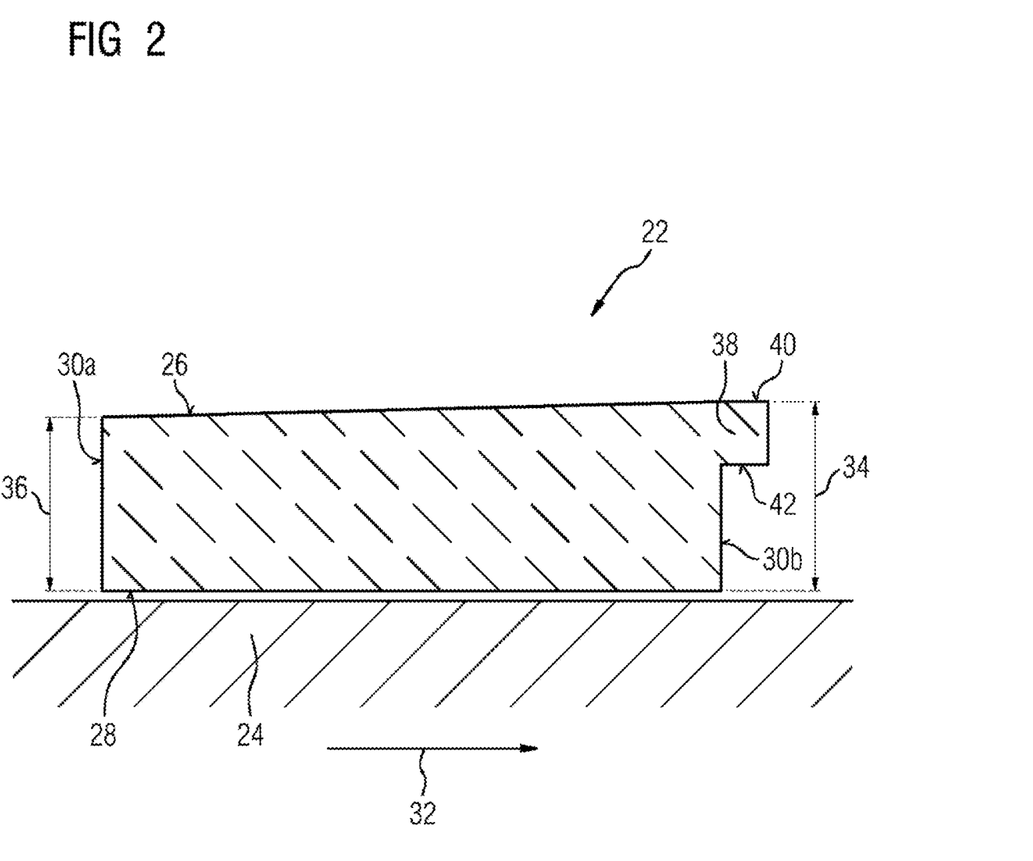
FIG. 2 shows, schematically and in longitudinal section, a heat shield element according to a first exemplary embodiment of the invention.

FIG. 2 shows, schematically and in longitudinal section, a heat shield element 22 according to a first exemplary embodiment of the invention.

The heat shield element 22 can be attached to a supporting structure 24 which is part of a heat shield. For example by means of retaining elements (not shown) which engage in corresponding engagement devices (not shown) on the heat shield element 22. The heat shield element 22 has a hot side 26 that can be exposed to hot gas and a cold side 28 opposite the hot side. The heat shield element 22 can be attached to the supporting structure 24 with the cold side 28 facing the supporting structure 24. The heat shield element 22 also comprises four peripheral sides, of which two opposite peripheral sides 30a, 30b are shown in this view.

The peripheral sides connect the cold side to the hot side. According to the invention, the heat shield element 22 has a spoiler shape. In the exemplary embodiment shown, the entire heat shield element, with the exception of a projection 38 extending the hot side beyond the base area of the cold side 28, is formed as a region of increasing height, such that the height of the heat shield element increases in a direction of increasing height 32 over the entire length of the cold side 28. The heat shield element 22 is thus formed essentially in the shape of a spoiler. The height 34 of the heat shield element is greater in the region of the at least one peripheral side 30b, toward which the direction of increasing height 32 is oriented, than the height 36 of the heat shield element in the region of the at least one peripheral side 30a in the opposite direction.

The direction of increasing height 32 is oriented perpendicular to the peripheral side 30b. The region of increasing height thus extends in the direction of increasing height 32 as far as the projection 38, the region of increasing height being bounded in the opposite direction by the peripheral side 30a.

The peripheral side 30b, toward which the direction of increasing height 32 is oriented, comprises a projection 38 extending beyond the width of the peripheral side 30b. The projection 38 has an upper side 40 which is part of the hot side and, opposite this, an underside 42. The heat shield element 22 is advantageously made of a ceramic material. The height of the heat shield element increases constantly and linearly over the entire width (in this case the width runs perpendicular to the plane of the drawing) of the heat shield element in the direction of increasing height 32 essentially over the entire length of the cold side, wherein, at the transition to the upper side of the projection, the increase in height transitions constantly into the horizontal profile of the upper side of the projection.

Figure 3:
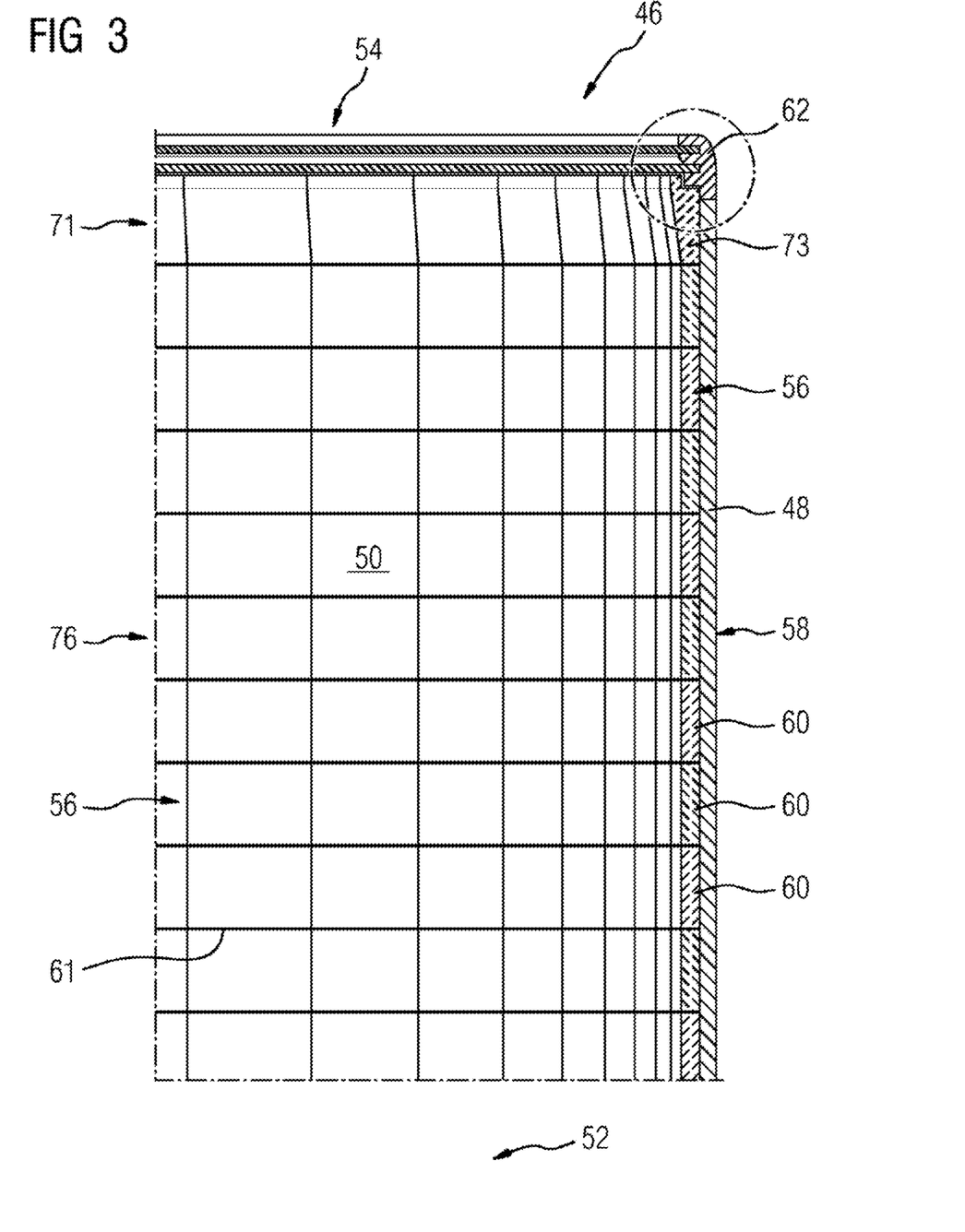
FIG. 3 shows, schematically and in longitudinal section, a section of a combustion chamber according to a second exemplary embodiment of the invention.

FIG. 3 shows, in a highly simplified schematic manner, a section of an inventive combustion chamber 46 in longitudinal section. The combustion chamber 46 comprises a combustion chamber wall 48 that bounds a hot gas path 50 flowing through the combustion chamber and has, at its downstream end, a combustion chamber outlet 52 (not shown in greater detail) which can be arranged at a turbine inlet of the gas turbine. At its upstream end, the combustion chamber comprises a combustion chamber head end 54, wherein the combustion chamber head end 54 comprises a burner arrangement (not shown). For protection from hot gases, the combustion chamber 46 is lined with a heat shield 56. The heat shield 56 comprises a supporting structure 58 and a number of heat shield elements 60, 73 which are attached to the supporting structure 58 essentially areally while leaving expansion gaps 61.

Figure 4:
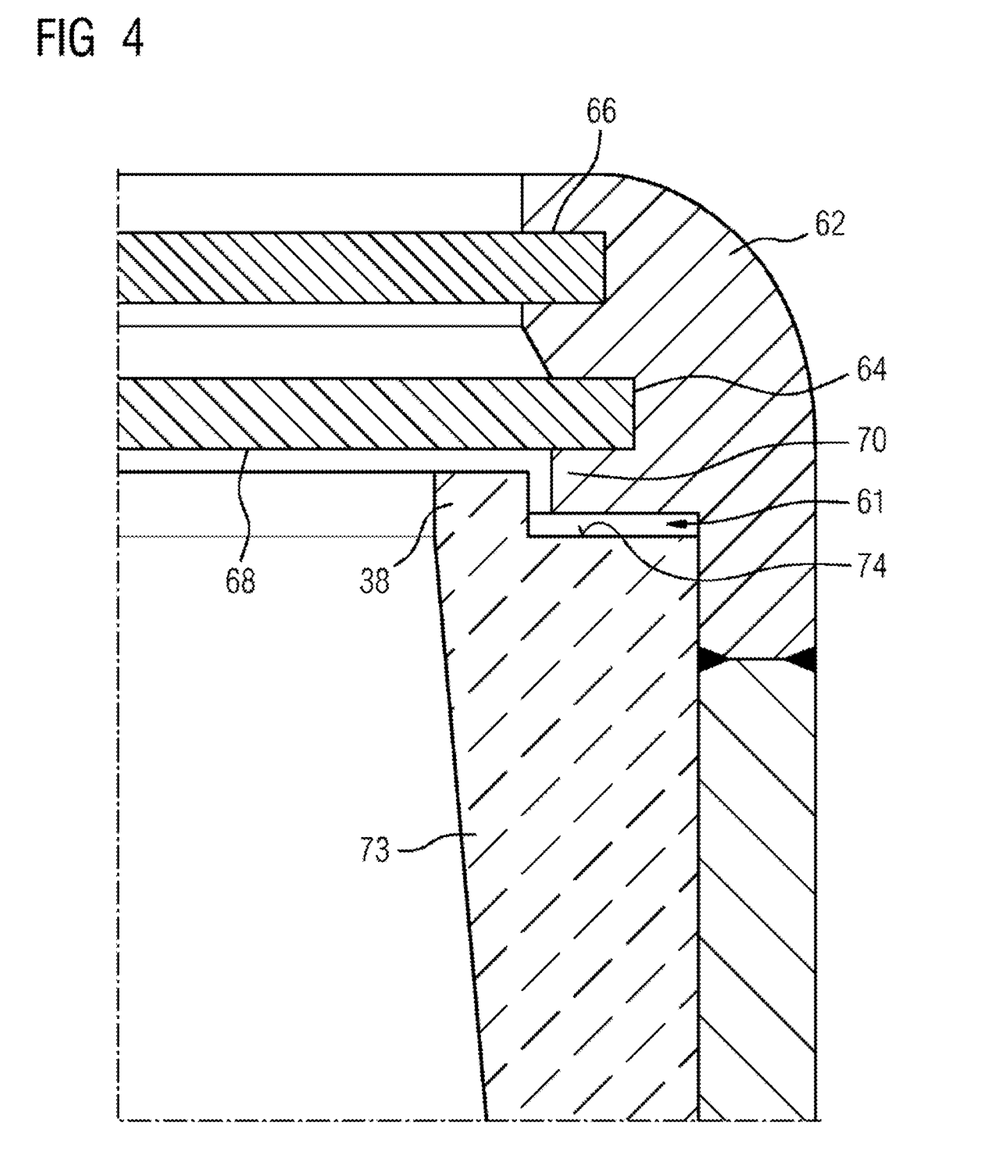
FIG. 4 is a detail view of the section, circled in FIG. 3, of the combustion chamber in the region of the F-ring at the combustion chamber head end.

The combustion chamber wall 48 comprises, at its upstream end, an encircling component 62, this region of the combustion chamber being shown enlarged in FIG. 4. As shown in FIG. 4, two annular grooves 64, 66 are created in the encircling component 62. A flame bottom 68, which inwardly bounds the combustion chamber head end 54, is secured in the groove 64. The heat shield adjoins, with an encircling ceramic final row 71, the web 70 bounding the groove 64 to one side, while leaving an expansion gap 61. The heat shield elements of the final row 71 are formed according to the invention, wherein the direction of increasing height of the spoiler-shaped heat shield elements is oriented toward the web 70 and that end face 74 of the final row 71 that is oriented toward the web 70 is higher than the adjoining region of the web 70.

That peripheral side of the heat shield elements 73 which is oriented toward the web has a projection 38, wherein the projection 38 projects beyond that region of the web 70 which runs between the flame bottom 68 and the final row 71.

In order to provide additional hot gas protection for the combustion chamber wall 48, the heat shield elements of the heat shield 56 can be laid by means of the method as claimed.

For example, the row 76 can be used as a row that is to be arranged last.

The invention claimed is:

1. An apparatus, comprising:
a supporting structure, and an end wall at an upstream end of the supporting structure, wherein the upstream end is configured to accommodate a burner arrangement of a combustor of a gas turbine engine, and
a number of heat shield elements made of a ceramic material, each of which comprises a hot side that can be exposed to hot gas and a cold side opposite the hot side and peripheral sides that in each case connect the hot side to the cold side,
wherein each of the number of heat shield elements is attached to the supporting structure essentially areally, wherein expansion gaps are disposed between each of the number of heat shield elements, each with the cold side facing the supporting structure, and each comprising a height normal to the cold side,
wherein the height of at least one heat shield element in a final row of plural rows of the number of heat shield elements increases in a direction of increasing height, wherein the height of the at least one heat shield element does not decrease in the direction of increasing height along an entire length of the at least one heat shield element, wherein a region of increasing height of the at least one heat shield element extends in the direction of increasing height essentially as far as at least one peripheral side of the at least one heat shield element or as far as a projection of the at least one heat shield element that extends the hot side of the at least one heat shield element beyond a base area of the cold side of the at least one heat shield element,
wherein the direction of increasing height of the at least one heat shield element is oriented toward a common end face of the final row, wherein the final row is arranged upstream of all other rows of the plural rows, and
wherein the direction of increasing height is oriented upstream toward the end wall.

2. The apparatus as claimed in claim 1,
wherein the region of increasing height extends at least over the entire base area of the cold side of the at least one heat shield element.

3. The apparatus as claimed in claim 1,
wherein in the region of increasing height, the height of the at least one heat shield element increases continuously in the direction of increasing height.

4. The apparatus as claimed in claim 1,
wherein the direction of increasing height is oriented essentially perpendicular to an upstream peripheral side of the at least one heat shield element.

5. The apparatus as claimed in claim 4,
wherein the at least one heat shield element comprises, on a peripheral side toward which the direction of increasing height is oriented, the projection extending essentially over the width of the peripheral side, wherein the projection comprises an upper side which is part of the hot side of the at least one heat shield element and an underside opposite the upper side.

6. The apparatus as claimed in claim 1,
wherein each heat shield element of the final row comprises an end face that forms a portion of the common end face, wherein the supporting structure defines a hot gas path therethrough, wherein the end face of the at least one heat shield element extends inward toward the hot gas path farther than does a region of the supporting structure adjoining or adjacent the end face.

7. The apparatus as claimed in claim 6,
wherein the projection of the at least one heat shield element projects beyond a respective adjoining region of the supporting structure.

8. The apparatus as claimed in claim 1, further comprising:
a combustion chamber comprising a combustion chamber wall that comprises the supporting structure and which bounds a hot gas path flowing through the combustion chamber, the combustion chamber comprising, at its downstream end, a combustion chamber outlet which is arranged at a turbine inlet of the gas turbine engine, and comprises, at an upstream end of the combustion chamber, a combustion chamber head end, wherein the combustion chamber head end comprises the burner arrangement.

9. The apparatus as claimed in claim 8,
wherein the combustion chamber wall comprises, at the upstream end of the combustion chamber, an encircling component in which is created at least one annular groove, wherein the end wall, which inwardly bounds the combustion chamber head end, is attached in the at least one annular groove, and the at least one heat shield element from the final row is adjacent to a web that bounds the at least one annular groove to one side, wherein an expansion gap is located between the at least one heat shield element and the web, wherein the supporting structure defines a hot gas path therethrough, and
wherein the direction of increasing height of the final row of the number of heat shield elements is oriented toward the web, and wherein the common end face of the final row that is oriented toward the web extends inward toward the hot gas path farther than does an adjacent region of the web.

10. The apparatus as claimed in claim 9,
wherein the at least one heat shield element comprises the projection extending essentially over a width of an upstream peripheral side of the at least one heat shield element, which projection comprises an upper side which is part of the hot side of the at least one heat shield element and, opposite the hot side, an underside,
wherein the projection projects over a region of the web that is located between the end wall and the final row.

11. A method for lining a combustion chamber with the apparatus according to claim 1, comprising:
attaching the number of heat shield elements in rows, while leaving the expansion gaps between the number of heat shield elements, on the supporting structure, arranged on a combustion chamber wall of the combustion chamber,
(a) wherein, with the exception of a row that is to be arranged last of the rows, matching the expansion gaps between the rows to an ideal expansion gap width,
(b) and determining a remaining width of a space left for the row that is to be arranged last,
(c) from the remaining width, taking into account the ideal expansion gap width, determining an ideal width of heat shield elements of the row that is to be arranged last,
(d) and producing the heat shield elements of the row that is to be arranged last in accordance with the ideal width of the heat shield elements and arranging the heat shield elements of the row that is to be arranged last in the space,
wherein the remaining width of the space left for the heat shield elements of the row that is to be arranged last is determined by provisionally lining the space with a provisionally arranged row of heat shield elements of measured width, and a width of at least one expansion gap adjoining the provisionally arranged row is determined during operation of the combustion chamber.

12. The apparatus as claimed in claim 1,
wherein in the region of increasing height, the height of the at least one heat shield element increases continuously and linearly in the direction of increasing height.

13. An apparatus, comprising:
a combustion chamber comprising a combustion chamber wall that comprises a supporting structure and which bounds a hot gas path flowing through the combustion chamber, the combustion chamber comprising, at its downstream end, a combustion chamber outlet which is arranged at a turbine inlet of a gas turbine, and comprises, at an upstream end of the combustion chamber, a combustion chamber head end, wherein the combustion chamber head end comprises a burner arrangement, and
a number of heat shield elements made of a ceramic material, each of which comprises a hot side that can be exposed to hot gas and a cold side opposite the hot side and peripheral sides that in each case connect the hot side to the cold side,
wherein each of the number of heat shield elements is attached to the supporting structure essentially areally, wherein expansion gaps are disposed between each of the number of heat shield elements, each with the cold side facing the supporting structure, and each comprising a height normal to the cold side,
wherein the height of at least one heat shield element in a final row of plural rows of the number of heat shield elements increases in a direction of increasing height, wherein the height of the at least one heat shield element does not decrease in the direction of increasing height along an entire length of the at least one heat shield element, wherein a region of increasing height of the at least one heat shield element extends in the direction of increasing height essentially as far as at least one peripheral side of the at least one heat shield element or as far as a projection of the at least one heat shield element that extends the hot side of the at least one heat shield element beyond a base area of the cold side of the at least one heat shield element,
wherein the direction of increasing height of the at least one heat shield element is oriented toward a common end face of the final row,
wherein the final row is arranged upstream of all other rows of the plural rows,
wherein the direction of increasing height is oriented upstream,
wherein the combustion chamber wall comprises, at the upstream end of the combustion chamber, an encircling component in which is created at least one annular groove, wherein an end wall, which inwardly bounds the combustion chamber head end, is attached in the at least one annular groove, and the at least one heat shield element from the final row is adjacent to a web that bounds the at least one annular groove to one side, wherein an expansion gap is located between the at least one heat shield element and the web, wherein the supporting structure defines a hot gas path therethrough, and
wherein the direction of increasing height of the final row of the number of heat shield elements is oriented toward the web, and wherein the common end face of the final row that is oriented toward the web extends inward toward the hot gas path farther than does an adjacent region of the web.

* * * * *